United States Patent
Fuehrer et al.

(10) Patent No.: US 7,383,458 B2
(45) Date of Patent: *Jun. 3, 2008

(54) METHOD AND DEVICE FOR SYNCHRONIZING THE CYCLE TIME OF A PLURALITY OF TTCAN BUSES BASED ON DETERMINED GLOBAL TIME DEVIATIONS AND CORRESPONDING BUS SYSTEM

(75) Inventors: Thomas Fuehrer, Gerlingen (DE); Bernd Mueller, Leonberg (DE); Florian Hartwich, Reutlingen (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 720 days.

This patent is subject to a terminal disclaimer.

(21) Appl. No.: 10/471,902

(22) PCT Filed: Mar. 14, 2002

(86) PCT No.: PCT/DE02/00912

§ 371 (c)(1), (2), (4) Date: Apr. 29, 2004

(87) PCT Pub. No.: WO02/075561

PCT Pub. Date: Sep. 26, 2002

(65) Prior Publication Data

US 2004/0193932 A1 Sep. 30, 2004

(30) Foreign Application Priority Data

| Mar. 15, 2001 | (DE) | ................................ 101 12 910 |
| Mar. 15, 2001 | (DE) | ................................ 101 12 912 |
| Mar. 15, 2001 | (DE) | ................................ 101 12 913 |

(51) Int. Cl.
*G06F 1/12* (2006.01)

(52) U.S. Cl. ...................................... 713/400; 713/600

(58) Field of Classification Search ................. 713/400
See application file for complete search history.

(56) References Cited

U.S. PATENT DOCUMENTS 5,838,995 A 11/1998 Chen et al.

(Continued)

FOREIGN PATENT DOCUMENTS

DE 100 00 302 7/2001

(Continued)

OTHER PUBLICATIONS

ISO Standard 11898-4, Road Vehicles—"Controller area network (CAN)—Part 4—Time-triggered comunication", ICS 43.040.15—International Organization for Standardization, 2003.

(Continued)

*Primary Examiner*—Chun Cao
(74) *Attorney, Agent, or Firm*—Kenyon & Kenyon LLP (57) ABSTRACT

A method, a device, and a bus system for synchronizing at least two TTCAN buses having at least one bus user, there being cycle times of the basic cycles in the TTCAN buses, a global time being determined in each TTCAN bus and the deviations of the global times of the TTCAN buses which are linked together by at least one user being determined from the global times, and the deviations of the individual global times being transmitted to at least one bus user, the cycle times of the TTCAN buses, which are connected by at least one user, being mutually adjusted as a function of the deviations in the global times in such a way that the buses are synchronized with respect to the cycle times.

10 Claims, 3 Drawing Sheets

U.S. PATENT DOCUMENTS

| | | | |
|---|---|---|---|
| 5,944,840 A * | 8/1999 | Lever | 714/34 |
| 5,991,844 A | 11/1999 | Khosrowpour | |
| 6,092,210 A | 7/2000 | Larky et al. | |
| 6,111,888 A * | 8/2000 | Green et al. | 370/461 |
| 6,128,318 A | 10/2000 | Sato | |
| 6,914,895 B1 * | 7/2005 | Straub et al. | 370/350 |
| 6,975,654 B1 * | 12/2005 | Domon | 370/509 |
| 7,107,473 B2 * | 9/2006 | Fuehrer et al. | 713/400 |

FOREIGN PATENT DOCUMENTS

| | | |
|---|---|---|
| DE | 100 00 303 | 7/2001 |
| DE | 100 00 304 | 7/2001 |
| DE | 100 00 305 | 7/2001 |
| EP | 0 942 556 | 9/1999 |
| EP | 1 052 793 | 11/2000 |
| JP | 2149036 | 6/1990 |
| JP | 11266236 | 9/1999 |
| JP | 2000216800 | 8/2000 |
| WO | 00 07335 | 2/2000 |

OTHER PUBLICATIONS

Banerjee et al., *A Time Driven Controller Area Network for Reliable Automation*, Indian Journal of Power and River Valley Development, Books and Journals Private, Ltd., IN, vol. 47, No. ½, Jan. 1997, pp. 6-8.

Fuehrer et al., *Time Triggered Communication on CAN (Time Triggeres CAN—TTCAN)*, Proc. of the International CAN Conference, 2000, pp. 1-7.

Bosch, CAN Specification 2.0, Sep. 1991, pp. 1-68.

\* cited by examiner

METHOD AND DEVICE FOR SYNCHRONIZING THE CYCLE TIME OF A PLURALITY OF TTCAN BUSES BASED ON DETERMINED GLOBAL TIME DEVIATIONS AND CORRESPONDING BUS SYSTEM

FIELD OF THE INVENTION

The present invention relates to a method and a device for synchronizing the cycle time in at least two TTCAN buses and a corresponding bus system.

BACKGROUND INFORMATION

In recent years there has been a drastic increase in networking of control units, sensors, and actuators with the help of a communication system, i.e., a bus system, in today's automobile industry and machine construction, in particular in the machine tool sector and in automation. Synergistic effects may be achieved here due to the distribution of functions among a plurality of control units. These are known as distributed systems. Communication between different stations is increasingly being accomplished via at least one bus, i.e., at least one bus system. Communication traffic on the bus system, access and reception mechanisms, and error handling are regulated by a protocol.

The CAN (controller area network) protocol is well established in the automotive sector. This is an event-driven protocol, i.e., protocol activities such as sending a message are initiated by events having their origin outside of the communication system. Unique access to the communication system, i.e., bus system, is triggered via a priority-based bit arbitration. A prerequisite for this is that a priority is assigned to each message. The CAN protocol is very flexible. It is thus readily possible to add additional nodes and messages as long as there are still free priorities (message identifiers). The collection of all messages to be sent in the network together with their priorities and sender nodes plus possible reception nodes are stored in a list known as the communication matrix.

An alternative approach to event-driven spontaneous communication is the purely time-triggered approach. All communication activities on the bus are strictly periodic. Protocol activities such as sending a message are triggered only by the passing of time, which is valid for the entire bus system. Access to the medium is based on the allocation of time ranges in which one sender has the exclusive sending right. The protocol is comparatively inflexible; new nodes may be added only if the corresponding time ranges have been freed up in advance. This circumstance requires that the order of messages be determined even before starting operation. Therefore, a schedule is drawn up which must meet the requirements of the messages with regard to repeat rate, redundancy, deadlines, etc. This is known as a bus schedule. The positioning of messages within the transmission periods must be coordinated with the applications which produce the message content to minimize the latency between the application and the transmission time. If this coordination does not take place, the advantage of the time-triggered transmission (minimum latent jitter in sending the message on the bus) would be lost. High demands are made of the planning tools. TTP/C is such a bus system.

The requirements outlined above for a time-triggered communication and the requirements for a certain measure of flexibility are met by the method of time-triggered CAN known as TTCAN (time-triggered controller area network), which is described in German Published Patent Application No. 100 00 302, German Published Patent Application No. 100 00 303, German Published Patent Application No. 100 00 304 and German Published Patent Application No. 100 00 305 as well as ISO Standard 11898-4 (currently in the form of a draft). TTCAN meets these requirements by establishing the communication cycle (basic cycle) in exclusive time windows for periodic messages of certain communication users and in arbitrating time windows for spontaneous messages of a plurality of communication users. TTCAN is based essentially on a time-triggered periodic communication, which is cycled by a user or node which gives the utilization time and is known as the time master, with the help of a time reference message, or, for short, reference message. The period until the next reference message is known as the basic cycle and is divided into a predefinable number of time windows. A distinction is made between the local times, i.e., local timers of the individual users, i.e., nodes, and the time of the time master as the global time of its timer. Additional principles and definitions based on TTCAN are given in the ISO Draft 11898-4 or the related art cited above and are thus assumed to be known and will not be described further explicitly here.

Thus there are numerous real time bus systems for networking control units in automation, in motor vehicles or elsewhere, including the aforementioned CAN, TTP/C or Byteflight as well as TTCAN, also mentioned above. CAN, TTCAN and Byteflight are single-channel bus systems, which means that redundancy may be achieved by duplication of the corresponding system. TTP/C is an intrinsically two-channel system, i.e., redundancy is always built in. As a service, many bus systems provide a time base synchronized to the bus. In the bus systems originally designed as two-channel or multichannel systems, synchronization is usually forced by design, typically by the fact that one node, i.e., user, must transmit on both buses simultaneously. This has some advantages, (e.g., synchronization is always ensured) but it also has a number of disadvantages, e.g., the fact that each bus may not be operated independently, the time patterns on the two buses may differ only to a very limited extent and the modularity of the two or more bus systems is lost due to the coupling which is provided by design.

As explained, it is obvious that the related art is incapable of yielding optimum results in all regards. This situation is to be improved with the present invention as described below.

In the case of buses, i.e., bus systems, designed as single-channel systems, synchronization is performed explicitly if needed. In the following, a TTCAN network and/or a plurality of TTCAN buses, i.e., bus systems, and their coupling are assumed as the bus system, but this is to be understood as restrictive with regard to the object of the present invention to be explained later only inasmuch as the properties of the TTCAN are the prerequisite, i.e., are necessary, for representing the object according to the present invention.

SUMMARY Of The INVENTION

The present invention relates to a method, a device, and a bus system for synchronizing at least two TTCAN buses having at least one bus user, cycle times of the basic cycles being available in the TTCAN buses, a global time being determined in each TTCAN bus, and the deviations in the global times of the TTCAN buses being determined from the global times, these buses being connected via at least one user and the deviations in the individual global times being transmitted to at least one bus user, and the cycle times of the TTCAN buses connected via at least one user to one another being adjusted as a function of the deviations in the global times, so that the buses are synchronized with respect to the cycle times.

The cycle times of the TTCAN buses connected by at least one user are advantageously adjusted by adjusting the phase of the global time.

The cycle times of the TTCAN buses connected by at least one user are expediently adjusted by adjusting the frequency of the global time.

In an advantageous embodiment the phase of the cycle time is adjusted as a function of the value of at least one predefined bit.

It is also advantageous that the at least one predefined bit corresponds to the Next_is_Gap bit of the TTCAN.

A smallest time unit (NTUZ) in the at least two TTCAN buses to be synchronized is determined advantageously for adjusting the frequency to the global time and the ratio of these smallest time units is determined and the resulting real ratio is compared with a predefined ratio, at least one smallest time unit being adjusted so that the predefined ratio is achieved.

In addition, it is advantageous that the predefined ratio corresponds to an integer, in particular a multiple or submultiple of the number two.

DETAILED DESCRIPTION

The present invention describes general possibilities for how a fault-tolerant bus system, i.e., network, may be created from a combination of a plurality of TTCAN buses. This is particularly advantageous in conjunction with the mechanisms with regard to synchronization of the global time of a plurality of TTCAN buses and/or synchronization of the cycle time of a plurality of TTCAN buses so that mutual synchronization of all these buses in the total bus system or network may be accomplished.

Figure 1:
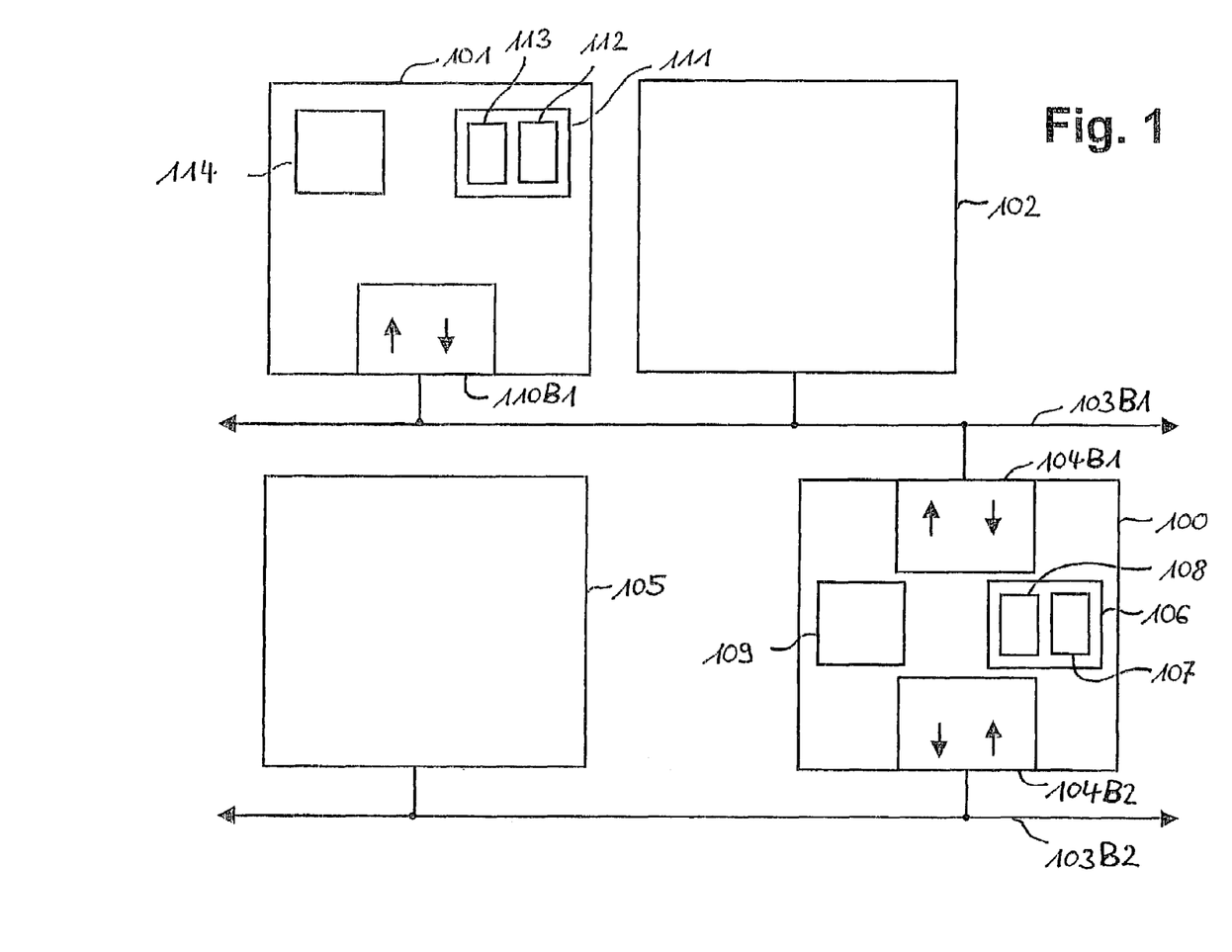
FIG. 1 shows the coupling of two TTCAN bus systems via a user which functions as a gateway user.

FIG. 1 shows a bus system, i.e., network composed of a plurality of TTCAN buses, i.e., TTCAN bus systems, namely two in the present case. A first bus 103B1 and a second bus 103B2 are shown. Two users 101 and 102 are connected to the first bus 103B1. A user 105 is connected to second bus 103B2. User 100 is connected to both buses 103B1 and 103B2 and functions as a connection user or gateway computer, i.e., gateway user or gateway controller which has access to both buses. A coupled pair of TTCAN buses (103B1 and 103B2 here) is thus defined as a combination of two TTCAN buses such that there is at least one gateway user having access to both buses. The connection of the individual users to the particular bus is accomplished via a corresponding interface element, e.g., interface element 110B1 in the case of user 101. Likewise, user 100 is connected as a gateway user to bus 103B1 via an interface element 104B1 and to bus 103B2 via an interface element 104B2. As an alternative, one interface element having two terminals may also be provided for connection to bus 103B1 and to bus 103B2 in contrast with two interface elements 104B1 and 104B2.

Timers 111 and 106 having an internal clock source or time source 107 and 112 in particular a quartz crystal or an oscillator, in particular a VCO (voltage controlled oscillator) are also shown in users 100 and 101, respectively. In addition, time detection modules, in particular counters 108 and 113 are also contained in particular timers 106 and 111, respectively.

Control functions in the particular user in particular for input/output of data to the bus system, for transfer of time information from the timer and for synchronization of the buses, i.e., bus users and other methods and method steps, etc., in particular those according to the present invention may be performed by modules 109 and/or 114 as processing modules, in particular a microcomputer or microprocessor or controller. Parts of this functionality or the entire functionality may also be provided directly in the particular interface module.

A user may also be preselected as a time reference generator as defined by TTCAN, in particular for one bus system. This user, the time reference generator as the time master, thus specifies the basic cycle as described in the related art. It is also possible for the gateway user to function as a time reference generator, i.e., as a time master for both bus systems. The time generator of the corresponding reference user, i.e., the time master of the particular TTCAN system by which the local time of this time master is determined is thus considered to be the reference time generator, i.e., it specifies the reference time for the corresponding bus system, i.e., 103B1 and/or 103B2. In other words, the local time generator, e.g., 106 and/or 111 of the specified reference user as the time master is thus considered a global time generator of the corresponding bus, i.e., bus system 103B1 and/or 103B2 and it specifies the global time of the corresponding bus.

FIG. 1 thus shows a coupled pair of TTCAN buses having a gateway user or gateway node. For more precise representation of this coupling according to the present invention the following description according to the present invention is used.

At least two TTCAN buses B1, B2 are coupled when there is a series Pi=(BXi, BYi), where i=1 to n, and there are n elements Ni having the following properties:
BXi, BYi are TTCAN buses for all i,
For an i, BXi and BYi form a coupled pair of TTCAN buses,
BX(i+1) is BYi (for i=1 to n−1),
BX1 is bus B1 and BYn is bus B2.

In other words, two TTCAN buses B1 and B2 are coupled when they are connected by any path of coupled pairs, regardless of its complexity. A system of at least two TTCAN buses is referred to here as a fault-tolerant TTCAN bus system if two of the buses are coupled (in the sense described above). All system architectures using a fault-tolerant TTCAN bus system or network are thus detectable.

Figure 2:
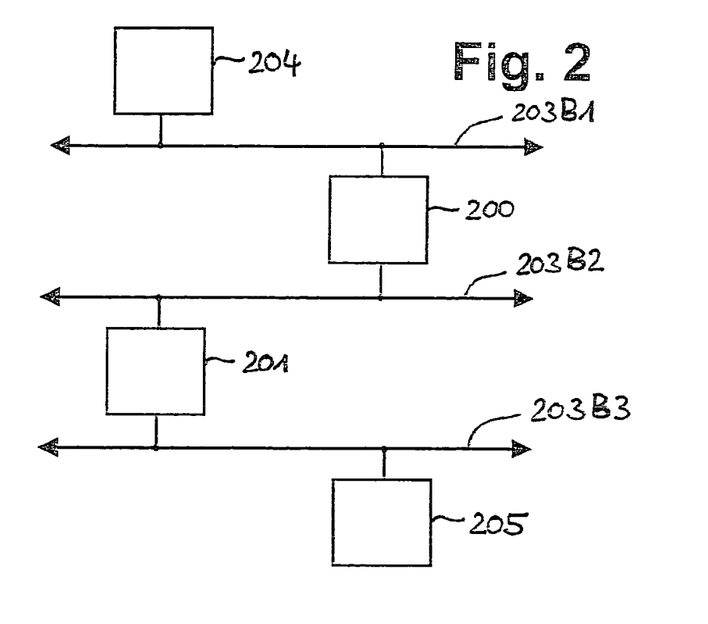
FIG. 2 shows the coupling of three TTCAN bus systems by coupled pairs.
Figure 3:
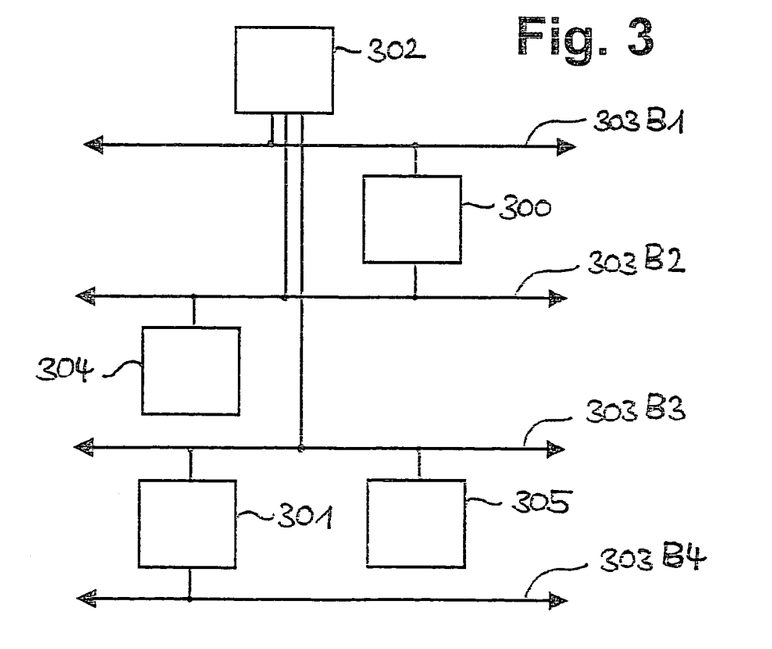
FIG. 3 shows the coupling of four TTCAN bus systems by various users to illustrate scalable tolerance.

Additional examples are shown in FIGS. 2 and 3. FIG. 2 shows three TTCAN buses 203B1, 203B2, and 203B3 as well as bus users 200, 201, 204, and 205. Buses 203B1 and 203B2 are linked together by user 200, and buses 203B2 and 203B3 are also linked together by user 201. Thus, in the sense according to the present invention, bus systems 203B1 and 203B3 are connected in a fault-tolerant system according to the definition given above, in particular with respect to synchronization, by the coupling of bus systems 203B1 and 203B2 as well as 203B2 and 203B3 as coupled pairs by users 200 and 201. In contrast with conventional redundant systems, i.e., two buses in the entire bus system, in which each node or user is connected in a redundant manner to each other bus, i.e., each user has a connection to each bus, the system architectures proposed here allow a scalable fault tolerance and a mixture of fault-tolerant and non-fault-tolerant systems due to the use of coupled pairs.

This is explained again using the example of FIG. 3, which shows four buses 303B1, 303B2, 303B3, and 303B4. In addition, bus users 301, 302, 300, 304, and 305 are also shown. Buses 303B1 and 303B2 are linked together by user 300, and buses 303B3 and 303B4 are linked by user 301. At the same time, three buses 303B1, 303B2, and 303B3 are linked by a user 302, so that a mixture of fault-tolerant and non-fault-tolerant systems is made possible, while the desired fault tolerance in the system is scalable, i.e., it may be represented in various degrees of redundancy (single, dual, multiple redundancy). It is thus possible to introduce higher degrees of redundancy into a system without thereby coupling systems which should remain separated, which also permits a reduction of common mode errors, i.e., common-mode faults of the bus system(s).

In combination with the synchronization mechanisms in TTCAN, it is thus possible to create a uniform synchronized communication system that permits all conceivable degrees of fault tolerance in the simplest manner. Synchronization is described in greater detail below with respect to the global time as well as the cycle times of individual users or bus systems.

A general method of how two or more TTCAN buses, in particular level 2 buses (see ISO Draft) are able to synchronize their global times with one another will be described first. This method may be used by dedicated hardware, by the application running on the corresponding host, or by a special software layer.

The method of synchronization including possible variations in the sequence is described below. A pair of buses is referred to here as being directly synchronizable if there is at least one gateway computer having access to both buses, as described above. The general prerequisite is also that there is a chain of gateways between two buses to be synchronized, connecting the two buses via directly synchronizable pairs, i.e., the coupled pairs mentioned above. The synchronization layer (hardware or software) which performs the synchronization is referred to below as synchronization layer SL. In doing so, the SL need not necessarily be present on each node, as also indicated by the following description.

In one embodiment, the gateway user or gateway computer is the time master in at least one of the two buses to be synchronized for adjusting the time in the bus in which it is time master. Optionally, as an additional embodiment, a message may be transmitted from the gateway user to the time master to perform the corresponding time adjustment for the synchronization. Then it is not necessary for the gateway user to also be time master of at least one of the bus systems to be synchronized.

For initialization, the initialization procedure specified for this bus according to ISO 11898-4 and the state of the art for the TTCAN runs on each TTCAN bus. As a result this yields two or more TTCAN buses running independently of one another and having different global times and different time masters at a given time. In an optional variant, the system design may ensure that the same node, i.e., user, becomes the time master on both buses or on a plurality of buses.

Figure 4:
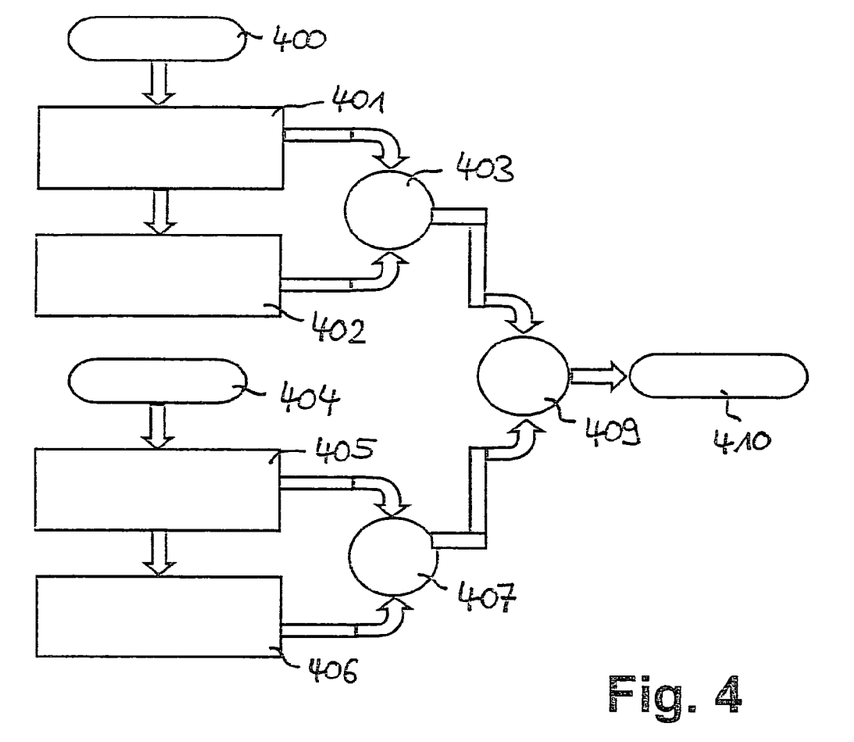
FIG. 4 shows a flow chart of frequency adjustment between two TTCAN buses, i.e., TTCAN bus systems.
Figure 5:
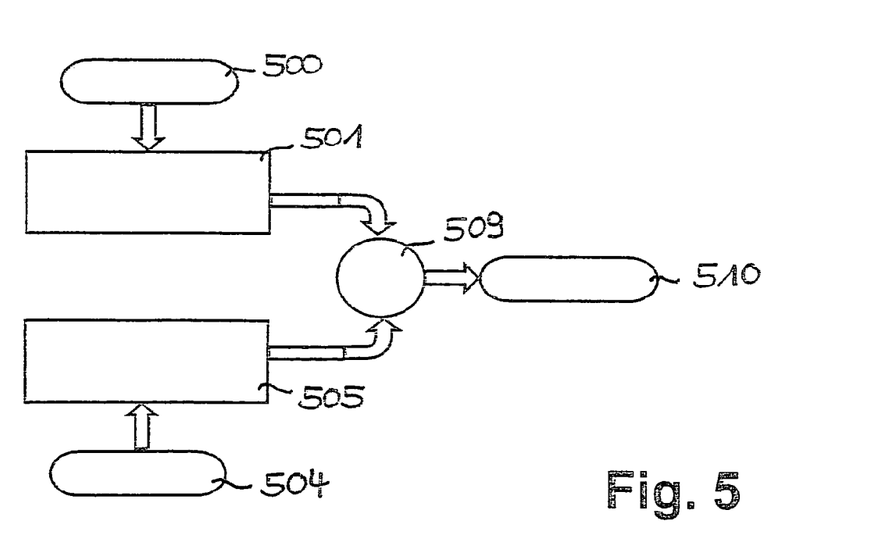
FIG. 5 shows a flow chart to illustrate the phase adjustment of two TTCAN buses, i.e., TTCAN bus systems.

Then on the basis of FIGS. 4 and 5, frequency adjustment and phase adjustment are described, whereby the frequency and the phase of the buses are adjustable independently of one another; in an advantageous embodiment, first the frequency is adjusted because as long as the frequency is wrong, i.e., deviates, the phase will be changed continuously.

A) Frequency Adjustment Between Two Buses

In the TTCAN the rate of the global time, i.e., the length of time unit NTU, is determined by the timer frequency of the time master, i.e., in particular the oscillator frequency or quartz crystal frequency and its TUR (time unit ratio) value. NTU (network time unit) refers to the time units of the global time of the particular bus, and TUR refers to the ratio between the length of an NTU and the length of a specific basic time unit, e.g., the local timer period, i.e., in particular the local oscillator period as described in ISO Draft 11898-4. Synchronization layer SL must ensure that the NTUs on the various buses have the intended ratios to one another. The SL may be implemented in hardware or software by processing units 109 and/or 114, etc., but the SL need not necessarily be inherent in all users, as mentioned already.

Essentially different procedures are conceivable. One bus may be coordinated with the others by selecting the frequency of one bus, i.e., rate of the global time of the one bus as a setpoint and determining the difference in rate, i.e., frequency, of the other bus, the at least one additional bus being coordinated with the others or the at least two buses being close to one another with respect to the rate of the global time, i.e., in particular the frequency of the timer of the particular time masters. In addition, the adjustment may be performed in one step or gradually. The particular strategy depends on the SL, i.e., the synchronization layer, and the requirements of the particular applications. All methods have in common the following system:

The SL determines the correction to be performed for a bus and notifies the time master at that time. The correction may be, for example, the ratio of the instantaneous TUR value and the new TUR value to be set. It is particularly advantageous if the SL determines the correction on the time master so that the correction value may be the new TUR value directly, for example.

The SL determines the new TUR value in the time master and uses it after the following cycle.

All the other nodes of this bus then follow the time master via TTCAN synchronization.

FIG. 4 shows in block 400 the global time of the first bus, e.g., B1 being determined, e.g., 103B1. This is determined at a point in time T1 in block 401, i.e., captured, so that a first capture value of the global time of bus BI is obtained in block 401. Likewise at time T1 a value of the global time of bus B2 determined in block 404, e.g., 103B2 is detected, i.e., captured in block 405. At the next point in time T2 the particular first capture value is advanced from block 401 or block 405 to block 402 or block 406 and a new second capture value is detected with respect to the global time of the particular bus in block 401 or 405. From these two capture values in block 401 and block 402 and/or block 405 and block 406, the particular rate of the global time or the clock rate of particular bus B1 and/or B2 is determined by forming the difference in block 403 and/or block 407. Then by forming the difference in block 409 a correction value is obtained from these values for the rate of the global time of the particular bus, this correction value representing the difference in the rate of the global times of the buses in question, i.e., the difference in the particular clock rate, i.e., the timer rate. As mentioned above, this may also be accomplished by way of the particular TUR value, for example. The rest of the procedure according to the present invention then takes place with the help of the value for the frequency adjustment in block 401 with the help of the value determined in block 409.

The frequency adjustment is to be illustrated again using an example. There are two buses B1 and B2. The synchronization strategy is that B2 must adjust the length of the NTU to the length valid on B1. In a simplest case it is assumed that both are nominally the same length. The application (SL) of the present time master of B2 is assumed to have direct access to the bus B1 and the same timer, i.e., the same clock source or time source, i.e., the same oscillator or quartz crystal is to be used for B1 and B2. Then the NTUs of the two buses B1 and B2 are exactly the same length when the TUR value of this node or user with respect to bus B1 is equal to the TUR value of the node and/or user with respect to bus B2. Thus, the SL must use the TUR value with respect to B1 as the TUR value with respect to B2.

In principle, the situation may be handled in the same way if the NTUs of the two buses have any desired ratio to one another. This is then easily implementable in hardware to advantage if the ratio or its inverse is an integer, namely in a particularly advantageous embodiment a power of two.

If the same timer, i.e., time source, is not used for both buses; then there is the possibility of measuring the difference in the global times of the two buses twice or more often, i.e., periodically in succession, and calculating a correction factor from a comparison between the observed change in difference and the nominal change in difference. This possibility also exists if the present time master does not itself have access to both buses. As an alternative, the SL may measure the length of a basic cycle on a bus in units of the other bus and then determine the correction value therefrom.

B) Phase Adjustment

For the phase adjustment the SL measures the phase difference between two global times on two buses and determines the jump, i.e., correction value to be set for each of the two buses. This may be accomplished in an advantageous manner with the help of the stopwatch register of the TTCAN.

The SL then notifies the two time masters present on the two buses regarding the particular jump, i.e., correction value to be set. A time master that has set a jump presupposes a predefined bit, specifically in the case of TTCAN the discontinuity bit in the next reference message and shifts its global time by the corresponding amount. Then the time reference message, i.e., the reference message of the corresponding time master is sent at the adjusted point in time. After successfully sending this reference message(s) on at least one of the two buses, if necessary, the at least two buses are synchronized with one another.

FIG. 5 shows this phase adjustment. The global times of two buses are determined in block 500 and 504 and detected, i.e., captured, in block 501 and block 505, respectively. Capturing preferably occurs at the same point in time T1. Then the two computer values are sent directly for forming a difference in block 509 where the phase difference, i.e., the difference in the clock phase, the clock source phase or the time source phase may be determined based on the simple capture values of the two buses. The remaining method described according to the present invention is then executed in block 510.

In particular when there are more than two buses it is advantageous if in the case of such a paired synchronization of two buses, the jump, i.e., correction takes place on only one of the two buses, i.e., one of the two buses assumes a master role for the global time. In other words, the global time on the first bus remains unchanged while the global time on the second bus jumps, i.e., is changed. In this case more than two buses may be synchronized successively via the paired synchronization with no problem without this synchronization of a pair having a particularly complex influence on that of another pair.

This is to be illustrated on the basis one example. There are five buses B1, B2, B3, B4, B5 in the system. The synchronizable, i.e., coupled pairs are (B1, B2), (B1, B3), (B2, B4), (B3, B5). If B1 is the master for B2 and B3, B2 is the master for B4, and B3 is the master for B5, then the paired synchronization (B2 and B3 are synchronized first to B1, then B4 is synchronized to B2, and B5 is synchronized to B3) results in system-wide synchronization within two cycles.

In the same system, synchronization could also be performed without the master principle. Then, however, the SL must ensure that once buses are synchronized they will remain synchronized, i.e., a jump, i.e., a change on one bus will also take place on all buses synchronized with it.

In addition, it is advantageous (but not necessary) for the time master of a bus to be synchronized to also have direct access to the global time of the corresponding partner bus. In this case, the SL may be set up only on the potential time masters of one bus, i.e., the message of the SL regarding the size of the jump to be set is omitted or becomes very-simple.

It is not necessary for the NTUs, i.e., the time units of the global time on the buses to be synchronized to be the same. However, it is particularly simple and useful if the (nominal) NTUs between two coupled buses differ only by an integral factor (powers of two in a particularly advantageous manner).

C) Phase Adjustment by Frequency Shift

As an alternative to the mechanism described above with respect to the phase adjustment in point B, there is also the possibility of achieving a phase adjustment through a long-term change in rate (see point A in this regard). The procedure in principle is exactly the same as that described in point A) for the frequency adjustment between two buses. In this case, however, the goal is not to adjust the NTU of the bus to be adjusted exactly to the target value there, but instead to lengthen or shorten this NTU slightly so that the clock, i.e., timer, to be adjusted is incremented somewhat more slowly or more rapidly, and thus a phase adjustment is achieved over a longer period of time.

D) Preserving the Synchronized State

After a phase adjustment as in B) or C) there are various possibilities for maintaining the synchronized state—first by repeating the phase adjustment as soon as the observed phase exceeds a certain value and second by adjusting the frequency as described in point A. In addition, there is a combination of these two possibilities. In the method described in point A, the frequency adjustment typically takes place one cycle later than a corresponding change in frequency in the master bus, so even in the case of a very precise matching of the frequencies of the buses involved there may result an accumulation of a difference. In this case a minor phase adjustment or compensation by a frequency which does not correspond exactly in a targeted manner, in particular a predefined manner must be performed occasionally.

Use of the corresponding TTCAN interface may be demonstrated with a debugging instrument. The performance on the bus may also be analyzed by bus monitoring.

A general method of synchronization is described below, showing how two or more TTCAN buses may synchronize their cycle times mutually. Here again, this method may be performed by dedicated hardware, by the application running on the corresponding hosts or by a special software layer.

This method including possible variants in the sequence is described below; the same prerequisites and definitions apply as was the case in synchronization of the global time, i.e., direct synchronizability when there is at least one gateway computer having access to both buses, and there is a chain of gateways between two buses to be synchronized, connecting the two buses via directly synchronizable coupled pairs. Here again the synchronization is performed by a synchronization layer in hardware or software which performs the synchronization and is referred to below as synchronization layer SLZ with respect to the cycle times. Here again, the SLZ need not necessarily be present at each node. First, the frequency adjustment between two buses will again be discussed here in point AZ.

AZ) Frequency Adjustment Between Two Buses

A frequency adjustment is possible only in TTCAN level 2 via protocol mechanisms. However, it is sufficient if the time master is operated in level 2 operation. For other nodes this is not necessary. The adjustment proceeds there like the corresponding adjustment for the global time as described above and thus cannot be made independent of this adjustment if the global time is also synchronized in the same network.

In TTCAN level 2, the rate of the cycle time, i.e., the length of unit of time NTUZ is determined by the frequency of the timer, in particular the oscillator of the time master and its TUR value, as already described above for the global time. The SLZ must ensure that the NTUZs have the specified ratios to one another on the different buses. The NTUZs may be the same as or different from the NTUs mentioned above.

In principle different procedures are conceivable. Either one bus may be adjusted to the others or two or more are mutually approximated. In addition, the adjustment may in turn take place in one step or gradually. The particular strategy depends on the SLZ and the requirements of the application. In particular the synchronization of the global time and synchronization of the cycle time may be performed by the same software layer, i.e., the same synchronization step SL, which may be expressed as follows in an advantageous embodiment:

$$SL=SLZ.$$

All the methods with regard to the frequency adjustment within the scope of the cycle time have in common the following scheme:

The SLZ determines the correction to be performed for a bus and informs the instantaneous time master thereof. The correction may be, for example, the ratio of the TUR value currently in effect and the new TUR value to be set. It is in turn particularly advantageous if the SLZ determines the correction on the time master. Then the correction value may be, for example, the new TUR value.

The SLZ determines the new TUR value in the time master and uses it starting with the following cycle.

All the other nodes of this bus then follow the time master via the TTCAN synchronization.

This method may be explained again on the basis of FIG. 4, where the sequence is essentially the same except that the cycle time is used instead of the global time. Therefore, reference is made here to the preceding discussion with regard to FIG. 4 and details will not be described explicitly again.

Another Example

There are two buses B1, B2. The synchronization strategy is that B1 must adjust the length of the NTUZ to the valid length on B1. In the simplest case, both are nominally the same length. The application (SLZ) of the current time master of B2 is assumed to have direct access to bus B1 and the same oscillator is to be used for B1 and B2. Then the NTUZs of the two buses B1 and B2 are exactly equal in length when this TUR value of this node with respect to B1 is equal to the TUR value of this node with respect to B2. The SLZ must thus use the TUR value with respect to B1 as the TUR value with respect to B2.

The situation may be handled in principle the same if the NTUZs of the two buses have any ratio to one another. It is then again advantageous in the hardware if the ratio or its inverse is an integer, in particular a power to two. If the same timer, in particular oscillator, is not used for both buses, there is again the aforementioned possibility of measuring the difference in the global times of the two buses at least twice and/or periodically in succession and calculating a correction factor from the comparison between the observed change in the difference and the nominal change in the difference. This possibility is also given again if the current time master does not have access to both buses. As an alternative, the SLZ may measure the length of a basic cycle from one bus in units of the other bus and then determine the correction value from this.

BZ) Phase Adjustment

The SLZ again measures the phase difference between two times on two buses and determines for each of the two buses the jump, i.e., change, to be set. The SLZ then notifies the two instantaneous time masters of the two buses regarding the particular jump to be set.

A time master that must set a jump in turn sets a predefined bit, here in particular the Next$_{is}$_Gap bit of the TTCAN (see ISO Draft) in the reference message. From the local SLZ it receives the starting point in time of the next basic cycle period.

After successfully sending this reference message(s) on one bus or both buses, the cycle time phases of the two buses are synchronized.

This is again represented in FIG. 5. as described above; instead of the global time, the cycle time is used and the Next_is_Gap bit is used. This desired phase may be 0 here, i.e., the basic cycle begins at the same time on both buses. However this is by no means necessary. It is not necessary for the NTUZs, i.e., the units of time of the cycle time, to be the same on the buses to be synchronized. However it is particularly simple and useful if the (nominal) NTUZs between two coupled buses differ only by an integral factor, in particular powers of two in an advantageous manner.

It is also not necessary for the cycle lengths of the buses to be synchronized to be the same. However the method proposed here is particularly beneficial when the (nominal) cycle lengths of the two buses are in a rational ratio to one another which does not use excessively large natural numbers because then it is regularly possible to speak of a fixed phase in an easily reproducible manner. Example: Two (nominal) cycles are running on one bus B1, while three are running on another bus B2. Then every other cycle on B1 (three cycles on B2) there is a theoretically fixed phase relation between B1 and B2.

In particular when there are more than two buses it is advantageous here if in the case of such a paired synchronization of two buses, the jump takes place only on one of the two buses, i.e., one of the two buses assumes a master role for the phase of the cycle time. In other words, the sequence of basic cycles on the first bus remains unchanged while a gap is inserted between two basic cycles on the second bus, and this gap is just large enough to adjust the desired phase. In this case, more than two buses may. be synchronized successively by paired synchronization without any problem and without the synchronization of one pair having any influence, in particular, any complex influence on that of another.

EXAMPLE

There are five buses B1 through B5 in the system. Synchronizable pairs include (B1, B2), (B1, B3), (B2, B4), (B3, B5). If B1 is the master for B2 and B3, B2 is the master for B4, and B3 is the master for B5, then the paired synchronization (B2 and B3 are first synchronized with B1, then B4 is synchronized with B2 and B5 with B3) will result in system-wide synchronization within two cycles.

In the same system, synchronization could also be performed without the master principle. Then, however, the SLZ would have to ensure that once buses have been synchronized they will remain synchronized, i.e., a jump, i.e., a correction on one bus must also take place on all the other buses synchronized with it.

In addition, it is advantageous (but not necessary) if the time master of a bus to be synchronized also has direct access to the corresponding partner bus. In this case the SLZ may be set up only on the potential time masters of a bus. In other words, the message of the SLZ regarding the size of the jump to be set, i.e., the correction to be set is eliminated and/or greatly simplified.

CZ) Phase Adjustment by Frequency Shift

As an alternative to the mechanism described in section BZ) in this case, here again there is the possibility of achieving a phase equalization through more gradual changing of the rate than in point AZ). The basic procedure is exactly the same as that described in point AZ). However, in this case the goal is not to adjust the NTUZs of the bus to be adjusted precisely to the target value there, but instead to lengthen or shorten these NTUZs slightly, so that the clock to be adjusted is incremented slightly more slowly or more rapidly and thus a phase adjustment is achieved over a longer period of time.

DZ) Preserving the Synchronized State

After a phase adjustment as in BZ) or CZ), there are various possibilities for maintaining the synchronized state as already described in point D) of synchronization of the global time:

Repeating the phase adjustment as soon as the observed phase exceeds a certain value.

Adjusting the frequency as in AZ) or A) or a combination of the two possibilities.

In the method described in AZ) or A), the frequency adjustment is typically performed one cycle later than a corresponding frequency change in the master bus, so even when there is a very precise matching of the frequencies of the buses involved, this may result in an accumulation of a difference. In this case a minor phase adjustment or compensation by a frequency which is known not to match exactly must be performed occasionally. As in synchronization of the global time, this use may be displayed via a debugging instrument, or performance on the bus may be analyzed with bus monitoring.

What is claimed is:

1. A method for synchronizing at least two TTCAN buses connected via at least one bus user and in which cycle times of basic cycles exist, comprising:
   determining a global time in each of the at least two TTCAN buses;
   determining deviations in the global times of the at least two TTCAN buses from the global times;
   transmitting the deviations to the at least one bus user; and
   adjusting the cycle times to one another as a function of the deviations in the global times, so that the at least two TTCAN buses are synchronized with respect to the cycle times.

2. The method as recited in claim 1, further comprising: adjusting cycle times of the at least two TTCAN buses by adjusting at least one phase of the global times.

3. The method as recited in claim 1, further comprising: adjusting the cycle times by adjusting at least one frequency of the global times.

4. The method as recited in claim 2, wherein: the at least one phase is adjusted as a function of a value of at least one predefined bit.

5. The method as recited in claim 4, wherein: the at least one predefined bit corresponds to a Next_is_Gap bit of TTCAN.

6. The method as recited in claim 3, further comprising: determining, in each instance, a smallest time unit in the at least two TTCAN buses for adjusting the at least one frequency;
   determining a ratio of the smallest time units to produce a resulting real ratio;
   comparing the resulting real ratio to a predefined ratio; and
   adjusting at least one of the smallest time units so that the predefined ratio is attained.

7. The method as recited in claim 6, wherein: the predefined ratio is an integer corresponding to one of a multiple of the number two and a submultiple of the number two.

8. A device for synchronizing at least two TTCAN buses linked together by at least one bus user, comprising:
   a first arrangement for:
     determining a global time in each of the at least two TTCAN buses,
     determining deviations in the global times of the at least two TTCAN buses from the global times, and
     transmitting the deviations to the at least one bus user; and
   a second arrangement for adjusting cycle times of the at least two TTCAN buses to one another as a function of the deviations in the global times, so that the at least two TTCAN buses are synchronized with respect to the cycle times.

9. The device as recited in claim 8, further comprising: a synchronization layer included in the at least one user and in which are contained the first arrangement and the second arrangement.

10. A bus system, comprising:

at least two data buses, a first data bus of the at least two data buses having a first number of users and a second data bus of the at least two data buses having a second number of users, wherein:

the at least two data buses include at least two TTCAN buses, at least one user of one of the first number of users and the second number of users corresponding to at least one connection user, such that two of the at least two TTCAN buses are simultaneously connected to the at least one connection user, and the at least one connection user performing a time-master function for each TTCAN bus being included, the at least one connection user that performs the time-master function predefining a basic cycle having a cycle time, and if the bus system includes more than two TTCAN buses, the TTCAN buses are connected in such a manner that, in each instance, at least two of the TTCAN buses have at least one common connection user; and a synchronization arrangement for determining a global time in each TTCAN bus and transmitting deviations in individual global times to those of the first number of users and the second number of users having the time-master function for adjusting a respective cycle time.

* * * * *